United States Patent [19]
Bieringer et al.

[11] Patent Number: 4,828,946
[45] Date of Patent: May 9, 1989

[54] PROCESS FOR THE PRODUCTION OF A SINTERABLE FINELY DIVIDED MOLDING COMPOUND HAVING A POLYVINYL CHLORIDE BASE AND ITS USE

[75] Inventors: Heimo Bieringer, St. Georgen, Austria; Klaus Engel, Duisburg, Fed. Rep. of Germany

[73] Assignee: Huels Aktiengesellschaft, Marl, Fed. Rep. of Germany

[21] Appl. No.: 129,557

[22] Filed: Dec. 7, 1987

[30] Foreign Application Priority Data

Dec. 6, 1986 [DE] Fed. Rep. of Germany ....... 3641815

[51] Int. Cl.$^4$ ...................... H01M 2/16; C08L 35/02; C08L 1/08
[52] U.S. Cl. .................................... 429/254; 106/169; 525/225; 525/226
[58] Field of Search ................ 429/240, 259; 525/200, 525/228, 226; 536/59, 63; 106/169

[56] References Cited

U.S. PATENT DOCUMENTS

| | | | |
|---|---|---|---|
| 3,293,199 | 12/1966 | Abercombie et al. | 526/200 X |
| 3,480,602 | 11/1969 | Abercrombie et al. | 526/200 |
| 3,701,742 | 10/1972 | Richardson et al. | 526/200 |
| 3,951,883 | 4/1976 | Ruchlak et al. | 521/145 |
| 3,951,945 | 4/1976 | Heesen et al. | |
| 4,005,251 | 1/1977 | Tung | 536/59 |
| 4,206,298 | 6/1980 | Reichert et al. | 204/296 X |
| 4,515,928 | 5/1985 | Schwarz | |

Primary Examiner—Stephen J. Kalafut
Attorney, Agent, or Firm—Millen & White

[57] ABSTRACT

The invention provides a process for the production of sinterable, finely divided molding compounds based on polyvinyl chloride by suspension polymerization of vinyl chloride in the presence of a suspending agent mixture of sulfated carbohydrate ester and cellulose ether. The compounds are useful for the production of sintered molded articles, such as separator plates. The molded articles or plates exhibit a slight electrical resistance and a high porosity with good acid storage volume.

28 Claims, No Drawings

PROCESS FOR THE PRODUCTION OF A SINTERABLE FINELY DIVIDED MOLDING COMPOUND HAVING A POLYVINYL CHLORIDE BASE AND ITS USE

BACKGROUND OF THE INVENTION

The invention relates to a process for the production of a sinterable finely divided molding compound by homopolymerization of vinyl chloride in aqueous suspension, in which, besides a suspending agent, a cosuspending agent from the class of sulfated carbohydrate esters is used, and its use for the production of separator plates for electric cells.

It is known to use molding compounds with a base of polyvinyl chloride for the production of sintered molded articles, for example, of separator plates for electric cells.

A process is described in DE-C No. 3-23 10 431 in which, for the production of the suspension polymer, a free emulsifier acid is used, besides the usual suspension stabilizers and nonionic wetting agents. From these polymers, sintered plates with good wettability and good mechanical properties can indeed be produced, but their electrical resistance is comparatively high.

In DE-A No. 33 34 667 a process is described, in which after vinyl chloride polymerization, before drying of the finely divided polymer, at least one nonionic wetting agent and one nonsurfactant acid are added. Even with polymers of this type, it is not possible to produce sintered plates, which, along with good mechanical properties have a slight electrical resistance.

In the course of optimizing the performance characteristics of electric cells, especially of batteries for use in motor vehicles, it was found that the cold starting performance of a battery can be considerably improved by a reduced electrical resistance of the sintered plates employed therein. It is thus desirable to produce sintered plates, which exhibit as small electrical resistance at possible. Sintered plates are also desired, which, with given plate thickness and strength, exhibit a high porosity. A high porosity of the sintered plate allows higher acid storage volumes and makes a reduction of the battery volume possible.

SUMMARY OF THE INVENTION

It is therefore an object of this invention to provide a process for the production of a sinterable, finely divided polyvinyl chloride molding compound which can be employed to produce molded articles having high porosity and low electrical resistance.

Upon further study of the specification and appended claims, further objects and advantages of this invention will become apparent to those skilled in the art.

These objects have been attained by providing a sinterable, finely divided polyvinyl chloride molding compound, which is produced by suspension polymerization of vinyl chloride at 40° to 80° C. in the presence of at least one oil-soluble, free radical-generating activator, optional molecule size modifiers, as well as cellulose ethers as suspension stabilizers, which is characterized in that 0.5 to 1% by weight, in relation to the monomer, of a suspending agent mixture is used, which consists of:

(a) 10 to 90% by weight, based on the mixture, of a 10-95% sulfated carbohydrate ester (based on the number of glucose units), consisting of a carbohydrate of the following formula:

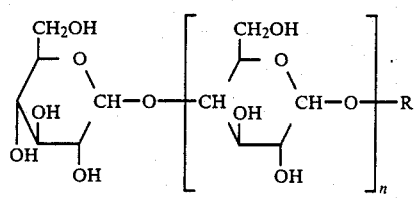

in which n signifies a number from 0 to 99 and R the radical of a 2- to 6-hydric aliphatic linear or branched alcohol with 2 to 12 carbon atoms, wherein said carbohydrate ester is an ester of a saturated or unsaturated, linear or branched hydrocarbon carboxylic acid with 6 to 24 carbon atoms, as well as (b) 90 to 10% by weight, based on the mixture of (a) and (b), of methylcellulose, methylhydroxyethylcellulose, methylhydroxypropylcellulose, hydroxyethylcellulose or hydroxypropylcellulose, or mixtures thereof, wherein a 2% by weight aqueous solution of said cellulose ethers at 20° C. exhibits a viscosity of 15 to 500·10$^{-3}$ Pa s.

DETAILED DESCRIPTION OF THE INVENTION

In a preferred embodiment of the process, component (b) consists of 90 to 10% by weight of methylcellulose, methylhydroxyethylcellulose or methylhydroxypropylcellulose or mixtures thereof with a degree of molar substitution of the methoxy group of 1.4 to 2.4 and a degree of molar substitution of the optionally present hydroxyalkoxy group of 0.08 to 0.28; or hydroxyethylcellulose or hydroxypropylcellulose with a degree of molar substitution of 1 to 3.5, wherein a 2% by weight aqueous solution of said cellulose ethers at 20° C. exhibits a viscosity of 15 to 500 10$^{-3}$ Pa·s. more preferably 20–200 10$^{-3}$ Pa·s.

Preferably component (a) is used in amounts of 20 to 80% by weight, based on the suspending agent mixture. A particularly preferred combination of properties of the polyvinyl chloride resin is obtained with the suspending agent mixtures, which contain as component (b) a methylhydroxypropylcellulose with a viscosity of 50 to 100 mPa s and which contain 20 to 80 and especially 70 to 30% by weight of component (b).

In a preferred embodiment of the process the degree of sulfation of the carbohydrate ester is 20 to 90%.

The degree of esterification of the carbohydrate ester is suitably 10 to 95%, especially 20 to 90% based on the total number of OH groups in the starting sugar.

The sulfated carbohydrate ester to be used as component (a) can be obtained by sulfation of a carbohydrate ester produced according to DE-OS No. 24 23 278. A general description of the sulfation is found in E. E. Gilbert, Sulfonation and Related Reactions, page 336, Interscience Publishers, New York - London - Sydney (1965).

The carbohydrate serving as the basis of the carbohydrate ester is made from aglycone and carbohydrate radicals. The carbohydrate radical contains 1 to 100, preferably 1 to 50, especially preferably 1 to 15, anhydroglycose units, which can be linked to one another alpha- and/or beta-glucosidally. The carbohydrate radical can have a homogeneous molecular structure, but preferably, it is a mixture of carbohydrates with a different number of anhydroglycose units.

The aglycone R—OH can be a 2- to 6-hydric aliphatic linear or branched alcohol with 2 to 12 carbon atoms. The following are suitable, for example: ethylene glycol, 1,2-propylene glycol, 1,3-propylene glycol, 1,2-butylene glycol, 1,4-butanediol, 1,6-hexanediol, glycerin, trimethylpropane, erythritol, pentaerythritol, pentitols, such as, for example, arabitol and xylitol, hexitols such as, for example, sorbitol, mannitol and dulcitol.

The carbohydrate, made up of aglycone and anhydroglycose units, can be esterified with saturated or unsaturated, linear or branched aliphatic carboxylic acids or carboxylic acid mixtures, which contain 6 to 24 carbon atoms.

As such carboxylic acids (fatty acids) there can be used, for example: caproic acid, caprylic acid, capric acid, lauric acid, myristic acid, palmitic acid, stearic acid, arachidic acid, behenic acid, lignoceric acid, palmitoleic acid, oleic acid, elaidic acid, linoleic acid, linolenic acid, ricinoleic acid or mixtures corresponding to their natural triglycerides, as, e.g., colza oil fatty acid, tall oil fatty acid, coconut oil fatty acid, soybean oil fatty acid, castor oil fatty acid, palm nut oil fatty acid, palm oil fatty acid, peanut oil fatty acid, cottonseed oil fatty acid, sunflower oil fatty acid, linseed oil fatty acid, tallow fatty acid and fish oil fatty acid.

The molar amount of acid component present in the carbohydrate ester is at least 1 mol, in relation to the carbohydrate, preferably 0.5 to 2 mol per anhydroglycose unit, and is limited at the upper end by the total number of OH groups available in aglycone and anhydroglycose units, i.e., in the total carbohydrate.

The sulfation reaction of the carbohydrate ester is performed so that degrees of sulfation of 10 to 95%, preferably 20 to 90%, result. The extent of the sulfation can be controlled by the choice of the reaction temperature, reaction period and the molar ratio of, e.g. chlorosulfonic acid to carbohydrate ester. The control of these parameters can be determined by routine and fully conventional optimization experiments well known to those skilled in the art.

The degree of sulfation reached can be determined according to a method of analysis described in K. Lindner, Tenside—Textilhilfsmittel—Waschrohstoffe [Surfactants—Textile Auxiliaries—Detergent Base Materials], Vol. III, 3058, Wissenschaftliche Verlagsgesellschaft mbH, (1971).

The polymerization of the vinyl chloride in aqueous suspension is performed in the presence of 0.001 to 3% by weight, preferably 0.01 to 0.3% by weight, in relation to monomer, of free radical-forming catalysts, such as, e.g., diaryl, diacyl peroxides, such as diacetyl, acetyl benzene, dilauroyl, dibenzoyl, bis-2,4-dichlorobenzoyl, bis-2methylbenzoyl peroxide; dialkyl peroxides, such as di-tertbutyl peroxide; peresters, such as tert-butyl percarbonate, tert-butyl peracetate, tert-butyl octoate, tert-butyl perpivalate; dialkylperoxide carbonates, such as diisopropyl, diethylhexyl, dicyclohexyl, diethylcyclohexyl peroxydicarbonates; mixed anhydrides of organic sulfoperacids and organic acids, such as acetylcyclohexylsulfonyl peroxide; as polymerization catalysts known and conventional azo compounds can be used such as azoisobutyric acid nitrile, besides optionally additions of persulfates such as potassium, sodium or ammonium persulfate, or peroxide catalysts, such as hydrogen peroxide, tertbutylhydroperoxide or other water-soluble peroxides as well as mixtures of different catalysts. The peroxide catalysts also can also be used in the presence of from about 0.012 to 1% by weight, based on the monomer, of one or more reducing agents, which are suitable for building up of a redox catalyst system, such as, e.g., sulfites, bisulfites, dithionites, thiosulfates, aldehyde sulfoxylates, e.g., Na formaldehyde sulfoxylate.

The polymerization is performed at 40° to 80° C., preferably 50° to 70° C., up to a monomer conversion of vinyl chloride of 60 to 95%, preferably 70 to 85%. From economical aspects, as high as possible end conversion is chosen, in which, with the suspending agent system according to the invention, vinyl chloride polymers are obtained, whose grain porosity (determined by plasticizer absorption at room temperature according to DIN 53 417/1) is very high even then, namely more than 25%.

The suspension polymerization is otherwise fully conventional and those of ordinary skill in the suspension polymerization art can readily optimize the conditions employed, perhaps with a few routine, fully conventional optimization experiments. The suspension polymerization step can be performed as disclosed e.g. in the monograph of H. Kainer "Polyvinylchlorid und Vinylchlorid-Mischpolymerisate", Springer-Verlag (1965) S. 12 ff.

After polymerization, a nonionic or amphoteric wetting agent can optionally be added, before the main amount of the aqueous phase is separated and the product is fed to a drying device. Examples for nonionic wetting agents are reaction products of ethyleneoxide with fatty alcohols on polypropylenglycol.

The following characteristic values are determined on the vinyl chloride polymer in the following ways:
apparent density: analogously to DIN 53 468
plasticizer absorption: analogously to DIN 53 417/1 (centrifuging process)
grain size distribution analogously to DIN 53 734 (air-jet sifting).

The vinyl chloride polymers obtained by the process of this invention have an apparent density of more than 400 g/l, a plasticizer absorption of more than 25% by wt and a grain size distribution from preferably 5 m to 63, m.

The vinyl chloride polymers of this invention can be used as sinterable finely divided molding compounds for the production of sintered molded articles such as thermal insulating material, packing for cooling towers, filters, water evaporators on heating bodies or also on ionexchangers, but especially for the production of separator plates for electric cells. A review about molding compounds is given by G. Menzel in Becker/Braun Kunststoff Handbuch 2/1 Polyvinylchlorid Hrsg. H. K. Felger, Hanser Verlag München, Wien (1986).

The use of the polyvinyl chloride molding compounds of this invention is fully conventional and analogous to other conventional polyvinyl chloride molding compounds.

From the molding compounds produced according to the invention separator plates can be produced by sintering, which exhibit a very low electrical resistance, a high plate porosity and a good tensile strength.

The production of the sintered plates takes place in the usual way by application of a specific layer thickness of the polyvinyl chloride powder to a steel strip, which is then put into a forced-air oven (230° C.) for sintering. The residence time and thus the intensity of the sintering is selected so that, with products according to the prior art, separating plates can be obtained, whose properties correspond to those of comparison example 1. The electrical flow resistance of the separators is determined with a microohmeter analogously to the process described in DE-A-No. 23 10 431. The tensile strength is determined analogously to DIN regulation 53 455. Electrical flow resistances of articles prepared from the molding Compounds of this invention are generally less than 1.0 m$\Omega$/dm$^2$. The tensile strength is generally at least 7 N/mm$^2$.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the preceding text and the following examples, all temperatures are set forth uncorrected in degrees Celsius and all parts and percentages are by weight; unless otherwise indicated.

Production of the sulfated carbohydrate ester

A total of 1.5 mol of chlorosulfonic acid, dissolved in 200 ml of methylene chloride, is instilled in a solution of 1.5 mol of carbohydrate ester in 1.5 liters of methylene chloride in the course of 1 hour at 0° C. with passing of a nitrogen stream (0.5 1/min). It is further stirred for 4 hours at 0° C., and 1 liter of ice water is added. The aqueous phase is neutralized with sodium hydroxide solution and bleached with 30 ml of 30% hydrogen peroxide. The sulfated product has a degree of sulfation of 75% and is further processed as accumulating aqueous solution.

The following amount data indicate parts by weight (pw).

COMPARISON EXAMPLE 1

(analogously to DE-C No. 3-23 10 432)

In a 40-liter polymerization autoclave the following mixture is polymerized at 59° C. and 340 rpm up to a residual pressure of 6 bars:
1000 pw of vinyl chloride
2000 pw of deionized water
4 pw of methylcellulose (viscosity 400 mPa s, 2% by weight of a solution at 20° C.)
1 pw of n-dodecylbenzene sulfonic acid
0.4 pw of polyoxyethylene sorbitan monolaurate
1 pw of dicetyl peroxydicarbonate The fine-grain polymerization sludge is filtered off and the polymer is dried in a vacuum cabinet.

The powder with a small grain porosity produces sintered plates with a high electrical volume resistance (Table 1).

EXAMPLE 1

In a 40-liter polymerization autoclave the following mixture is polymerized at 54° C. and 340 rpm up to a residual pressure of 5 bars:
1000 pw of vinyl chloride
2000 pw of deionized water
5 pw of methylhydroxypropylcellulose (METHOCEL$^R$ F 50 of DOW Chem. Co., Midland, U.S.A.)
2 pw of carbohydrate ester sulfate with a degree of sulfation of 80% on the basis of a colza oil fatty acid-polyglycosyl sorbitol ester with n=12 and a 1:1 molar ratio of anhydroglycose to carboxylic acid.
1 pw of dicetyl peroxydicarbonate.

After degassing of the residual monomer, 1 pw of a nonionic wetting agent, namely an addition product of 3 mol of propylene oxide and 1 mol of ethylene oxide, is stirred in, the fine-grain polymerization sludge is filtered off and the polymer is dried in a vacuum cabinet.

The powder has a high grain porosity and in the processing produces sintered plates with a very low electrical volume resistance and a good tensile strength (table 1)

EXAMPLE 2

In a 40-liter polymerization autoclave the following mixture is polymerized at 54° C. and 340 rpm up to a residual pressure of 6 bars:
1000 pw of vinyl chloride
2000 pw of deionized water
4 pw of methylhydroxypropylcellulose (METHQCEL$^R$ F 50 of DOW Chem. Co., Midland, U.S.A.) with the degree of molecular substitution of 2.0 and viscosity of 50 mPa s, measured in water at 20° C. as a 2% by weight solution
3 pw of carbohydrate ester sulfate with a degree of sulfation of 57% on the basis of a colza oil fatty acid-polyglycosyl sorbitol ester with n=12 and a 2:1 molar ratio of anhydroglycose to carboxylic acid.
1 pw of dicetyl peroxydicarbonate.

After degassing of the residual monomer, 1 pw of a nonionic wetting agent, namely an addition product of 3 mol of propylene oxide and 1 mol of ethylene oxide, is stirred in, the fine-grain polymerization sludge is filtered off and the polymer is dried in a vacuum cabinet.

The powder in the processing produces sintered plates with a very low electrical volume resistance and a good tensile strength (table 1)

COMPARISON EXAMPLE 2

The procedure is as in example 1, but as carbohydrate ester sulfate 3 pw of a type with a degree of sulfation of 7% is used.

The powder under selected conditions cannot be sintered into plates. With changed sintering conditions exclusively nonporous, thermally greatly damaged sintered plates, which are not suitable for use as battery separator plates, are obtained.

TABLE 1

| | PVC Powder Data | | | Sintered Separator Data | |
|---|---|---|---|---|---|
| | Apparent density (g/l) | Plasticizer absorption (% by wt) | Average grain size K (micron) | Electrical flow resis. (mohm/dm$^2$) | Tensile strength (N/mm$^2$) |
| Comp. ex. 1 | 415 | 15 | 27 | 1.6 | 9.8 |
| Comp. ex. 2 | 462 | 22.5 | 35 | (1) | (1) |
| Ex. 1 | 405 | 30 | 34 | 0.8 | 10.3 |
| Ex. 2 | 437 | 27 | 40 | 0.9 | 7.5 |

(1) Powder not sinterable

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for the production of a sinterable finely divided polyvinyl chloride molding compound comprising suspension polymerizing vinyl chloride in the presence of an effective amount of at least one oil soluble, free radical activator and an effective amount of a suspending agent mixture comprising:
   (a) 10 to 90% by weight of a carbohydrate ester, of a carbohydrate of the formula

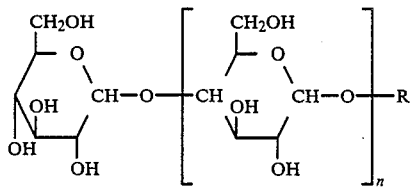

wherein n is a number from 0 to 99 and R is a 2 -to 6-hydric aliphatic alcohol with 2 to 12 carbon atoms, wherein said carbohydrate ester has been esterified with a hydrocarbon carboxylic acid of from 6 to 24 carbon atoms, and wherein said carbohydrate ester has been 10 to 95% sulfated, and
   (b) 90 to 10% by weight of a methylcellulose, methylhydroxyethylcellulose, methylhydroxypropylcellulose, hydroxyethylcellulose or hydroxypropylcellulose or a mixture thereof, which, when in a 2% by weight aqueous solution at 20° C., has a viscosity of 15 to $500 \cdot 10^{-3}$ Pa s.

2. A process of claim 1 wherein said methylcellulose, methylhydroxyethylcellulose or methylhydroxypropylcellulose of component (b) has a degree of molecular substitution of the methoxy group of from 1.4 to 2.4 and a degree of molar substitution of the hydroxyalkoxy group of from 0.08 to 0.28.

3. A process of claim 1 wherein said hydroxyethylcellulose and hydroxypropylcellulose of component (b) have a degree of molar substitution of from 1 to 3.5.

4. A process of claim 1 wherein said suspending agent mixture comprises from 20 to 80% by weight of component (a), based on the suspending agent mixture.

5. A process of claim 1 wherein component,(b) comprises methylhydroxypropylcellulose and said suspending agent mixture comprises from 20 to 80% of component (b) and has a viscosity of from 50 to 100 mPa s.

6. A process of claim 5 wherein said suspending agent mixture comprises from 30 to 70% of component (b).

7. A process of claim 1 wherein the degree of sulfation of said carbohydrate ester is from 20 to 90%.

8. A process of claim 1 wherein the degree of esterification of said carbohydrate ester is from 20 to 90%.

9. A process of claim 1 wherein the amount of said suspension agent mixture is from 0.5 to 1% by weight, based on the monomer.

10. A process of claim 1 wherein the suspension polymerization is conducted in the presence of a cellulose ether suspension stabilizer.

11. A process of claim 1 wherein the carbohydrate ester is based on a carbohydrate built up from aglycone and carbohydrate radicals and said carbohydrate comprises from 1 to 100 anhydroglycose units.

12. A process of claim 9 wherein said carbohydrate comprises from 1 to 15 anhydroglycose units.

13. A process of claim 12 wherein said carbohydrate ester comprises from 0.5 to 2 mols of said carboxylic acid radicals per anhydroglycose units.

14. A vinyl chloride polymer produced by the process of claim 1.

15. A sintered molded article of claim 14 wherein said article is a battery plate.

16. A vinyl chloride polymer produced by the process of claim 2.

17. A vinyl chloride polymer produced by the process of claim 3.

18. A vinyl chloride polymer produced by the process of claim 4.

19. A vinyl chloride polymer produced by the process of claim 5.

20. A vinyl chloride polymer produced by the process of claim 6.

21. A vinyl chloride polymer produced by the process of claim 7.

22. A vinyl chloride polymer produced by the process of claim 8.

23. A vinyl chloride polymer produced by the process of claim 9.

24. A vinyl chloride polymer produced by the process of claim 10.

25. A vinyl chloride polymer produced by the process of claim 11.

26. A vinyl chloride polymer produced by the process of claim 12.

27. A vinyl chloride polymer produced by the process of claim 13.

28. A suspending agent mixture comprising:
   (a) 10 to 90% by weight of a carbohydrate ester, of carbohydrate of the formula

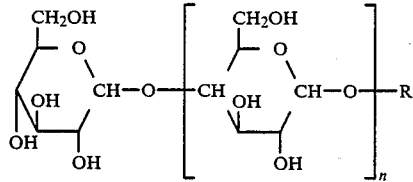

wherein n is a number from 0 to 99 and R is a 2- to 6-hydric aliphatic alcohol with 2 to 12 carbon atoms, wherein said carbohydrate ester has been esterified with a hydrocarbon carboxylic acid of from 6 to 24 carbon atoms, and wherein said carbohydrate ester has been 10 to 95% sulfated, and
   (b) 90 to 10% by weight of a methylcellulose, methylhydroxyethylcellulose, methylhydroxypropylcellulose, hydroxyethylcellulose or hydroxypropylcellulose or a mixture thereof, which, when in a 2% by weight aqueous solution at 20° C., has a viscosity of 15 to $500 \cdot 10^{-3}$ Pa s.

* * * * *